Jan. 20, 1970  N. J. G. BOLLEN ET AL  3,490,877
REVERSE ROTATION OF CRYSTALLIZATION MELT
Filed Aug. 1, 1966  2 Sheets-Sheet 1
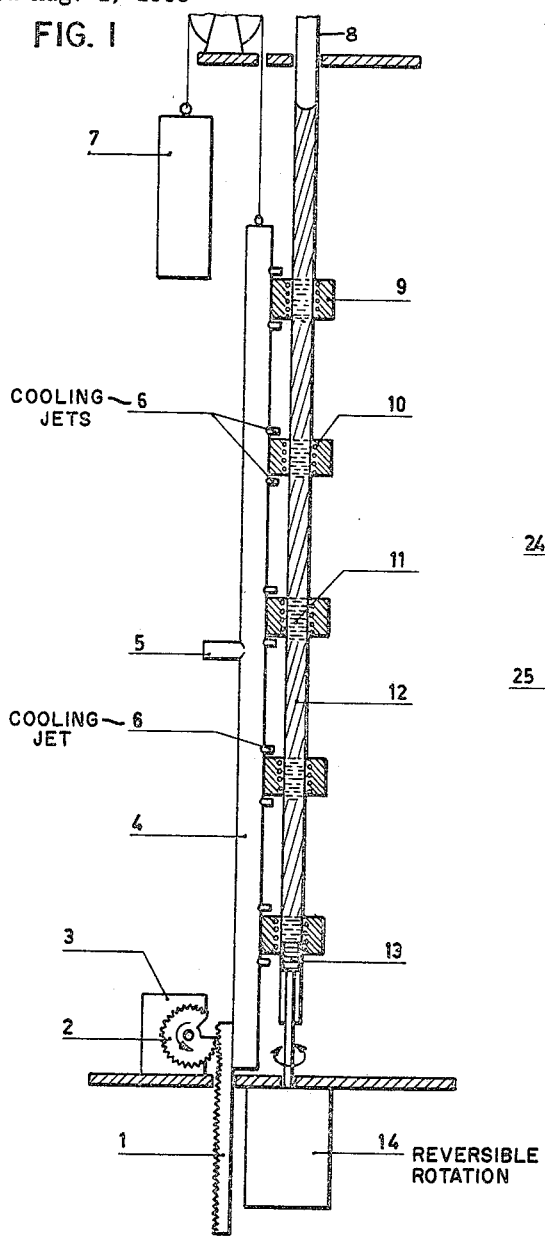
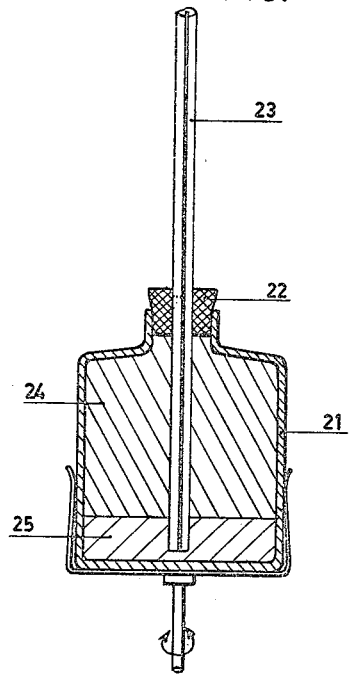
INVENTORS
NICOLAAS J. G. BOLLEN
MARIUS J. van ESSEN
WILHELM M. SMIT
WILHELMUS F. VERSTEEG
BY
Hammond and Littell
Attorneys

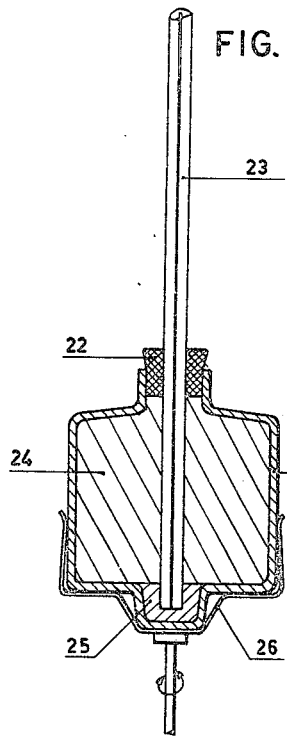
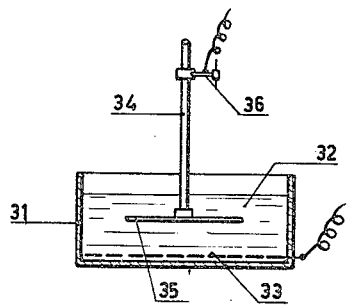
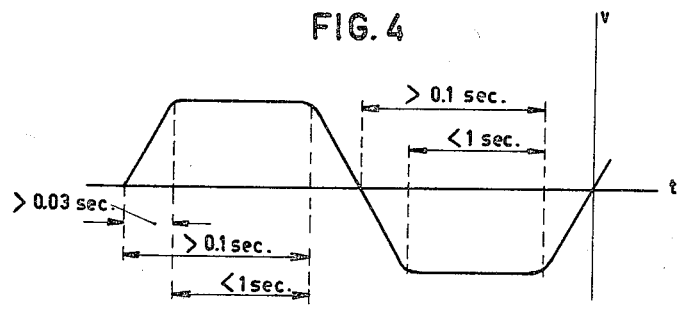

United States Patent Office 3,490,877
Patented Jan. 20, 1970

3,490,877
REVERSE ROTATION OF CRYSTALLIZATION MELT
Nicolaas J. G. Bollen, Jutphaas, Marius J. van Essen, Utrecht, Wilhelm M. Smit, Amsterdam, and Wilhelmus F. Versteeg, Utrecht, Netherlands, assignors to Nederlandse Centrale Organistatie voor Toegepast-Natuurwetenschappelijk Onderzoek, The Hague, Netherlands, a corporation of the Netherlands
Filed Aug. 1, 1966, Ser. No. 569,464
Claims priority, application Netherlands, Aug. 5, 1965, 6510191
Int. Cl. B01d 9/00; B01j 17/08
U.S. Cl. 23—273                  7 Claims

ABSTRACT OF THE DISCLOSURE

In a zone refining apparatus, a heater traverses a container while means are provided for rotating and reversing the rotation of a container.

---

The present invention relates to a method and a device for the intensive stirring of a liquid which is in contact with a solid, by applying periodically shifting shearing forces, to be exerted on the non-dispersed solid with respect to the liquid.

In methods, in which in the border zone between solid and liquid, concentration gradients and possibly as a result of these concentration potentials are formed, which are caused by the transportation of material towards and from the bordering surface between the solid and the liquid, an intensive mixing of the liquid, for instance by causing turbulence, is of considerable importance.

Such concentration gradients will, for instance, occur in electrode processes and in various crystallization processes, in which a progressing solidification or crystallization surface is found, as in zone melting and other "directed" crystallization processes, such as, for example dilatometer tests with melting substances.

In zone melting, the homogeneity of the liquid is upset by the progressing solidification surface. In the vicinity of this solidification surface, the liquid will show an accumulation of those components, which are relatively less prevalent in the solid phase than in the liquid phase. It is, however, essential for a good purification of the substance by means of zone melting that the liquid should be as homogeneous as possible.

Especially when in zone melting the liquid is locked in a tube between two layers or solid, stirring in the liquid phase is difficult to realize.

However, without the aid of stirring, the achievement of a sufficient degree of homogeneity in the liquid is dependent on the diffusion in the liquid and occasionally on the thermal convection in the liquid. Therefore, in zone melting, the selection of a linear growing velocity of the solidification surface, the so-called drawing velocity, larger than 0.5 to 2 cm. per hour is impossible, unless special measures are taken.

A prior art method for the zone melting of tellurium in an open vessel describes a proposal for subjecting the rod-shaped body to be treated to mechanical vibrations, such as rotatory vibrations. A frequency of from 10 up to about 30,000 cycles per second is specially recommended for this process, or also ultrasonic frequencies up to 150 kilocycles. In the description of the said prior art method, it is stated that the molten zones can be drawn through the rod-shaped tellurium body at a velocity of between 0.6 cm./hour and 6 cm./hour. In general, however, the said maximum drawing velocity will result in a mediocre purifying effect.

In the electrochemical conversion or the electrochemical separation of substances too, the current density which can be applied is a.o. limited by the transportation to the electrode surface of the substance to be reacted, whilst the purity of the substances separated is often unfavourably influenced by the slow removal of the contaminations from the border layer between the solid and the liquid, which removal depends on the diffusion velocity.

It is true that in an electrochemical process mechanical stirring is usually possible, but the conventional stirring methods leave a stationary liquid layer on the electrode untouched. By applying of, for instance, rotating electrodes it is indeed possible to effect a thinning of the stationary layer on the electrode, but in this manner neither an intensive mixing near the border surface, nor even a breaking up of the stationary layer can be effected.

The object of the invention is to provide a method for stirring liquid in which the border layer between the liquid and the solid is directly agitated and thereby strongly reduced.

Further objects of the invention are the application of the said method in various unit processes, in which said border layer forms a limiting factor, such as in zone melting, dilatometric determination of melting and congealing curves and in electrode processes.

According to the present invention the solid is subjected to a rotation with a periodically changed speed, in such a way that the average tangential acceleration or retardation directed along the border surface between the solid and the liquid, amounts to at least 200 cm./sec.$^2$, during at least 0.03 second each, whilst the lapse of time between the beginning of an acceleration period and the beginning of the subsequent retardation period is not less than 0.1 second, and that the periods, during which no acceleration or retardation or an acceleration or retardation of less than 200 cm./sec.$^2$ takes place, shall not be longer than 1 second.

It is possible to accelerate the rotation speed during at least 0.03 second and, after a stationary period, to retard the speed during at least 0.03 second until approximately the original rotational speed, in this way applying only a speed variation with a constant direction of rotation.

However, the most convenient way to carry out periodical changes in speed by successive retardations and accelerations is by periodically reversing the current to the driving electromotor thereby reversing periodically the direction of rotation.

In zone melting, the accelerations and retardations mentioned may advantageously be reached, by introducing the substance to be treated into a tube having a diameter of from 1 to 2 cm. and making this tube go through at least a few complete revolutions between each pair of successive retardations and accelerations.

The present method may also be used with good result in registering the melting curves of substances which crystallize very slowly, such as greases, for instance of cacao-butter, in a dilatometer having a centrally placed measuring capillary.

A further application of the method according to this invention and an embodiment adapted to it are possible in electrochemical reductions or oxidations. By this application, the concentration polarisation can be reduced to a very low minimum, because by the method according to this invention a stirring effect is obtained near the border layer, which is much intenser than the effect obtained by the methods known in the art.

The invention will be elucidated with reference to the embodiments of the devices represented in the drawings, followed by 2 working examples in the field of zone melting.

In these drawings

FIG. 1 shows an embodiment of a zone melting apparatus,

FIGS. 2a and b show dilatometers suitable for carrying out the method of the invention, FIG. 3 shows a schematical arrangement of an electrolysis vessel for the application of the method, and FIG. 4 shows a graph of the course of the tangential velocity with time in the method according to the present invention.

The device of FIG. 1 comprises a tube 8 of, for instance, glass, containing the substance which is being subjected to zone melting.

The tube 8 is placed on the shaft of a quickly reversible motor 14 with the aid of a stop 13, which has been introduced into the tube and is movable in axial direction. At its upper side the tube 8 is supported in such a way that the tube can rotate about its axis.

With the aid of a simple reversing device (not shown in the drawings) the electric current leads to the motor are reversed periodically causing the reversible motor 14 to rotate each time a number of revolutions backwards and forwards, the maximum number of revolutions per minute attained each time being 1450. The frequency with which the direction of rotation is reversed is 2 times per second and the acceleration or retardation from 0 to 1450 r.p.m. and from 1450 to 0 r.p.m. is effected in about one single revolution. Electromotors suitable for the purpose are commercially available.

Around the tube there are positioned five cylindrical furnaces 9, which can slide freely along the tube and which are connected to a lifting mechanism via an air dividing tube 4. This lifting mechanism comprises a schematically represented synchronous motor with reduction gear 3, a toothed wheel 2 having a recess and being driven by the said synchronous motor and a gear rack 1.

The height of lift and the distance between the centres of two successive furnaces amount to ⅕ of the length of the substance within the tube 8.

The molten zones 11 of the five furnaces move each time over ⅕ part of the length of the substance through the tube, after which the lifting mechanism is disconnected by the recess in the toothed wheel 2 and the furnaces fall back over ⅕ of the length of the substance by their own weight.

Thus each furnace takes over the molten zone of the previous furnace, with the exception of the lowermost furnace, which makes a new molten zone.

The lifting mechanism is partly relieved by the counterweight 7.

The considerable heat supply required is obtained by having the heating elements 10 mounted on the inner side of each furnace, so that they can radiate freely to the tube.

The required removal of heat is obtained by introducing air having an overpressure of from 10 to 20 cm. of mercury into the air intake 5. This air streams through the air dividing tube 4 and through blow nozzles 6 of about 1 mm. diameter against the tube, said nozzles being located about 6 mm. over and under the furnaces.

In order to take into account the expansion caused by the melting of each new zone, the stop 13 must be able to slide through the tube.

However, the clamping in the tube should be tight enough for the accelerations and retardations of the motor shaft to be followed without slipping.

When applying, in the apparatus of our invention, the cooling by means of directed air jets as described the drawing velocity of the tube is no longer limited except by the crystallizing velocity of the substance treated.

In addition to the increase in the drawing velocity in zone melting, it was found that the formation of or the transition into a stable crystal modification is greatly stimulated by the method of the present invention.

In FIGS. 2a and b, the reference numeral 21 indicates the dilatometer proper, which is provided with a stop 27, and with a capillary tube 23 leading through it and continuing almost down to the bottom; by 24 is indicated the substance to be measured (for instance a grease) and by 25 the measuring liquid (for instance water) which is not mixable with it. The dilatometer is placed in a holder 26, which can be subjected to the periodical rotation according to the invention about a shaft 27. Very convenient are dilatometers of the kind described with a diameter of 2.5 to 3 centimetres and an interval volume of about 16 or 20 millilitres. during the operation according to the present invention the revolving dilatometer, as usual in such determinations, is placed in a thermostatically controlled liquid bath the temperature of which is gradually lowered or raised.

In a dilatometric determination of the melt curve of cacao-butter, when the method according to the invention is not applied, the transition to the stable form takes many days; but it appeared that, when the method of the invention is applied, the said transition is completely finished within a few hours' time. With the aid of the present invention, the registering of a complete melting curve of cacao-butter in a dilatometer, which thus far required about a fortnight, can now be carried out in 1 day.

FIG. 3 shows an electrolysis vessel 31, filled with an electrolyte liquid 32, in which there is provided a fixed electrode 33 and electrode 35 arranged about a shaft 34, which is provided with a sliding contact 36 for current supply.

For practical reasons it is of course impossible to select accelerations and retardations of unlimited magnitude. Generally speaking, the upper limit will be determined by the mechanical strength of the solid. If the turbulences along the border surface are intensified to such a degree that particles of the solid are being dispersed in the liquid, then the probability of contaminations being enclosed increases again.

In the method, in which a cylindrical body, such as a tube, rotates about its axis in an accelerated and in a retarded way alternately, the acceleration and the retardation respectively obviously are functions of the distance of the axis of rotation.

It has been found that only the average acceleration and retardation should reach the required magnitude of 200 cm./sec.$^2$, so the acceleration and retardation occurring at about half the radius of rotation. Along the axis of the tube, where both the acceleration and the retardation are zero, there does indeed sometimes occur an extremely narrow zone, in which the mixing is inferior and in which consequently material of greater impurity is separated, but this zone is so small as to be negligible in comparison with the bulk of the liquid and often it is completely absent as a result of vortices occurring in the liquid.

Obviously, it is possible within the limits mentioned above, to find conditions, under which the effect obtained for a certain substance will be optimal. These optimal conditions will mainly depend on the crystal and crystallization properties of the solid phase which is separated, but also on the viscosity of the liquid.

Advantageously, the said minimum acceleration and retardation are between about 400 and 700 cm. per square second and for very viscous liquids (or in tubes or containers of very small diameter where capillary forces exert a comparable influence) the preferred acceleration may be still higher.

The larger the diameter of the mass to be rotated, the lower the rotation speed at which the desired shearing forces relative to the liquid are attained. Thus, in zone melting in a tube having a diameter of 12 mm. most favourable results are obtained with a rotation speed of between 1200 to 1500 r.p.m., and with a tube having a diameter of 5 mm. with rotation speeds of about 5000 to 8000 r.p.m.

The duration of time of 0.03 second, in which an acceleration or a retardation of at least 200 cm./sec.$^2$ is applied, is just sufficient to cause a sufficiently great difference in velocity between the solid and the liquid. However, the time interval of 0.03 second is not sufficient to bring the turbulences (which have arisen consequentially to this difference in velocity) along the border surface to complete development.

For this purpose, a period of about 0.1 second or more is required. All of this is represented in FIG. 4, in which the tangential velocity $v$ is plotted against the time $t$.

Naturally, it is conductive to the obtainment of an optimal purification effect, to apply as many accelerations and retardations as possible in a definite time span, while observing the above. For economical reasons, however (spent stirring energy), the greatest possible limitation of the number of accelerations or retardations will be sought after. It is disadvantageous to use periods, in which no acceleration or retardation takes place or in which accelerations or retardations of less than 200 cm./sec.$^2$ are applied, which take longer than 1 second, because otherwise the time, during which no turbulences are present near the border surface becomes too long.

The requirements of the present invention regarding to the minimum acceleration and retardation and regarding to the duration of the various periods as specified above lead to the following deductions.

As the time between two changes of speed is longer than 0.13 second, the number of changes per minute is less than about 480. In practice, the number of changes per minute will be no higher than about 200 to 250.

In general, the periods of retardation and acceleration will for economical and practical reasons be no longer than 0.2 second each, so that a period between two changes of speed will be less than about 1.4 seconds. This points to a number of changes amounting to more than about 40 per minute.

The lowest rotation speed which is compliable with the requirements set forth above is about 120 revolutions per minute.

The requirement of rotation points to a rotation of more than one whole revolution and preferably of more than 2 to 3 whole revolutions after each change of direction. Then, with 45 changes per minute, each time upwards of 2 entire revolutions are carried out between two changes.

At for instance 1200 r.p.m. and between 200 and 60 changes per minute, each change occurs after about every sixth or 20th revolution respectively.

EXAMPLE I

An example of an elegant and quick way of finding the optimal conditions for a definite substance when zone melting, is the following:

A small amount of a colouring substance, which will dissolve in the liquid phase but is unsoluble in the solid phase, is added to the substance to be treated (a colouring substance, known under the trade name of Sudan III will often prove to be useful for this purpose).

The substance which has been contaminated in this manner is introduced while in the molten condition into a tube having a diameter of about 2 cm. after which the contents are allowed to solidify starting from one of the ends (so-called "normal freezing").

Theoretically, there should be a separation of solid substance which is free from the colouring substance added. However, it appears that at a velocity of the crystallization front amounting to over 2 cm. per hour, all of the colouring substance is enclosed in the solid substance.

If, however, the treatment according to the present invention is applied to the tube, it appears that, even at velocities of the crystallization front of 100 cm. per hour, only a very small amount of colouring substance will be occluded. The obtainment of optimal conditions within the limits of the present invention may be realized by selecting, at drawing velocities of 120 cm. per hour or upwards, the extent of the retardation or of the acceleration, the duration of the acceleration and retardation periods and of the interval between these two periods in such a manner, as to obtain an optimal result from the visual point of view.

When applying this method to naphthalene mixed with 0.05% of Sudan III, it appeared that, at a drawing velocity of 80 cm./hour, it sufficed to pass a melding zone through the tube a few times only, for 70% of the material in the tube to be completely cleaned of the colouring substance.

EXAMPLE II

Separation bismuth-antimony

As is known in the art, the system bismuth-antimony will form mixed crystals. Therefore, there is mixability in the solid as well as in the liquid phase. The concentration ratios in the solid and liquid phases are determined by the so-called distribution coefficient, which may be derived from the phase diagram. In the conventional manner of zone melting, at drawing velocities of about 1 cm./hour, the fact is always taken into account that the separation of the components is considerably less than might be expected in view of the distribution coefficient. In this connection mention is sometimes made of a practical distribution coefficient. The distribution coefficient of the system antimony-bismuth was derived from the phase diagram and appeared to amount to 2.0.

On the ground of this figure a reasonable separation by zone melting might be expected. A tube was filled with a mixture of antimony and bismuth having an antimony content of 0.01%. A relatively very slight amount of radio active antimony was added as a tracer for determining local antimony concentrations without destroying the tube or attacking the mixture.

First, a couple of experiments were carried out, in which a furnace was moved along the tube at a velocity of 4 cm./h., and that one time, while the tube was constantly rotating in one direction (2000 r.p.m.) and one time while the tube was brought to a quick vibration. In both experiments, which otherwise were carried out in complete independence of each other, it appeared after they had been finished that there had not been any separation of the mixture at all.

However in a third experiment (the same homogeneous initial situation was started from on all three occasions) use was made of the stirring method according to the present invention and of a device as represented in the description of the figures, and the drawing velocity of the furnace was brought up to 80 cm./h. The direction of rotation was changed twice per second, the maximum number of revolutions per minute being 1450.

From the result of the analysis, obtained by measuring the course of the radioactivity along the tube, it was perfectly clear that even at this extremely high drawing velocity a good separation had been obtained and that the practical distribution coefficient to be derived from the results of the analysis very nearly approached the theoretically possible coefficient.

What we claim is:
1. Zone-refining apparatus comprising
   a container for unrefined material;
   a heating means surrounding a portion of said container;
   means for causing relative movement between said heating means and said container whereby said unrefined material constituting a zone is melted and said zone traverses the unrefined material continually extracting constitutents which are more soluble in the liquid than solid; and
   means for rotating and reversing rotation of said container whereby the liquid in said zone is agitated to dissipate the concentration gradient of said constituents in the vicinity of the solid phase of the un- refined material to thereby dramatically increase drawing velocity and efficiency of the extraction.

2. Apparatus of claim 1 wherein said means for rotating and reversing rotation of said container produces an average tangential acceleration or deceleration directed along the border surface between the solid and liquid portions of the unrefined material of at least 200 cm./sec.² during at least 0.03 of a second for each acceleration and deceleration, wherein the lapse of time between commencement of the acceleration period and commencement of the deceleration period is not less than 0.1 of a second and the period during which no acceleration or deceleration of more than 200 cm./sec.² takes place is up to 1 second.

3. Apparatus of claim 1 including
a plurality of said heating means uniformly spaced along said container; and
means for moving said plurality of heating means in unison.

4. Apparatus of claim 3 including
cooling means disposed adjacent said heating means for removing heat from the material in said container.

5. Apparatus of claim 4 including cooling means positioned on both sides of each of said plurality of heating means.

6. Apparatus of claim 4 wherein said means for moving said plurality of heating means in unison includes
a gear rack; and
a driver gear wheel engaging said gear rack.

7. Apparatus of claim 6 including
means in association with said gear wheel for breaking the engagement of said gear wheel and said gear rack whereby said plurality of heating means descend in unison a predetermined distance.

References Cited

UNITED STATES PATENTS

| 2,719,799 | 10/1955 | Christian | 148—1 |
| 3,228,753 | 1/1966 | Larsen | 23—273 |
| 3,353,914 | 11/1967 | Pickar | 23—208 |
| 3,403,007 | 9/1968 | Drangel et al. | 23—301 |
| 3,423,189 | 1/1969 | Pfann | 23—301 |

NORMAN YUDKOFF, Primary Examiner

R. FOSTER, Assistant Examiner

U.S. Cl. X.R.

23—301